United States Patent
David et al.

[15] 3,671,582
[45] June 20, 1972

[54] PROCESS FOR THE PREPARATION OF CARBONYL DERIVATIVES AND CARBOXYLIC ACIDS

[72] Inventors: Reginald David; Jean Estienne, both of Lyon, Rhone, France

[73] Assignee: Rhone-Poulenc S.A., Paris, France

[22] Filed: Dec. 5, 1968

[21] Appl. No.: 781,594

[30] Foreign Application Priority Data

Dec. 6, 1967 France..................................67131213

[52] U.S. Cl.......................260/533 R, 260/586 B, 260/592, 260/597 B, 260/599, 260/604 AC, 260/533 N
[51] Int. Cl.........................................................C07c 51/32
[58] Field of Search....................260/533 U, 523, 533, 597 B, 260/604, 586 B, 592

[56] References Cited

UNITED STATES PATENTS

| | | | |
|---|---|---|---|
| 3,439,044 | 4/1969 | Hirsch et al. | 260/533 R X |
| 3,534,093 | 10/1970 | Gerberich et al. | 260/533 R |
| 3,288,845 | 11/1966 | Schaeffer | 260/533 X |
| 3,365,499 | 1/1968 | Clement et al. | 260/597 |

Primary Examiner—Lorraine A. Weinberger
Assistant Examiner—Richard D. Kelly
Attorney—Cushman, Darby & Cushman

[57] ABSTRACT

Aldehydes, ketones and carboxylic acids are made by the oxidation of organic compounds, especially olefines, with oxygen in the presence of a Group VIII metal catalyst and in a liquid medium comprising dimethylsulphoxide alone or mixed with water.

8 Claims, No Drawings

PROCESS FOR THE PREPARATION OF CARBONYL DERIVATIVES AND CARBOXYLIC ACIDS

The present invention relates to a process for oxidation of organic compounds, especially olefines, to form carbonyl derivatives and carboxylic acids.

It is known that ethylene can be caused to react in a palladium salt solution in water or acetic acid to obtain acetaldehyde or vinyl acetate, the palladium salt being reduced to metallic palladium. In the industrial processes which are based on these reactions, cupric salts are used in addition (see, for example, French Patent No. 1,210,009) for re-oxidizing the metallic palladium to a soluble salt, and molecular oxygen is used to transform the cuprous salts into cupric salts. These processes have the disadvantage of giving rise to secondary products, for example, chlorinated derivatives, when the aforesaid salts are chlorides, and of necessitating the use of a very corrosive reaction medium for which titanium-lined apparatus is required.

It is also known (see French Patent No. 1,211,356) to transform olefines exclusively into carbonyl compounds by passing these olefines over catalysts which are based on metals of the subgroups 5 to 8 and 1 of the Periodic System, such as, for example, palladium dichloride, with oxygen and in the presence of steam or compounds giving steam under the reaction conditions. It is also known to obtain organic esters such as vinyl acetate and benzyl acetate from ethylene and toluene, respectively, by oxidation with molecular oxygen in acetic acid in the presence of a catalyst containing a nobel metal in elementary form, preferably palladium metal (see French Patent No. 1,346,219). The oxidation of ethylene gives acetaldehyde, ethyl acetate, methyl acetate and acetone as secondary products, as well as carbon monoxide and carbon dioxide.

A process for the preparation of acetaldehyde by oxidation of ethylene with oxygen in the presence of water has also been proposed (see French Patent No. 1,428,957), according to which a solid catalyst is used which contains an elementary noble metal of Group VIII of the Periodic System, advantageously palladium. In this process, acetic acid is obtained as secondary product, as well as carbon monoxide and carbon dioxide. It has been proposed (see French Patent No. 1,437,023) to improve the preceding process by carrying out the oxidation of ethylene in the presence of manganese and/or cobalt compounds. However, when the catalyst is periodically regenerated, the recovery of the pure palladium is complicated by this presence of other metals.

The present invention provides a process for the preparation of aldehydes, ketones and/or carboxylic acids by oxidation of organic compounds, especially olefinic compounds by contacting with molecular oxygen or gaseous mixtures containing molecular oxygen, in the presence of a Group VIII metal catalyst in a liquid medium comprising 1 to 100 percent by volume dimethyl sulphoxide (D.M.S.O.) and 99 to 0 percent of water.

The olefines capable of being oxidized by the present process can contain one or more olefinic double bonds; they can in addition be substituted. Thus, for example, it is possible to use olefines of the formula:

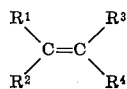

in which $R^1$, $R^2$, $R^3$, $R^4$ are the same or different and each represents a hydrogen atom or an aliphatic, cycloaliphatic or aromatic hydrocarbon radical, it also being possible for two of these radicals to form a divalent alkylene group optionally comprising a hetero atom such as O, N, S. Preferably $R^1$, $R^2$, $R^3$ and $R^4$ each represents hydrogen, alkyl of one to 10 carbon atoms, or phenyl, and $R^1$ and $R^3$ may together make up a polymethylene chain of three or four carbon atoms. More specifically, according to the present process, ethylene, propylene, butenes, hexene, decene, dodecene, butadiene, cyclopentene, cyclohexene and styrene can be oxidized.

The process according to the invention gives, as oxidation product, aldehydes or ketones or a mixture of these carbonyl derivatives, and carboxylic acids. The nature and the proportion of these different reaction products depend on the compound oxidized and on the reaction conditions, particularly on the proportion of water and D.M.S.O. The process of the invention is important because it gives good yields of carbonyl derivatives and acids and, with the reactions leading to aldehyde/acid mixtures, it is possible easily to modify the relative proportions of these two products by altering the proportion of water and D.M.S.O.

The liquid solvent, an essential constituent of the reaction medium, is D.M.S.O. or a mixture of water and D.M.S.O., containing more than 1 percent, and preferably more than 2.5 percent, by volume of D.M.S.O. The range of best possible concentrations depends on the reaction product which is desired (carbonyl derivative or acid) and on the nature of the olefine used. In the case of oxidation of ethylene into acetaldehyde, the water-D.M.S.O. mixture preferably contains 70 to 99 percent of D.M.S.O. (by volume).

It is advantageous to employ palladium as the nobel metal catalyst. It can be used as the finely divided metal, or it can even be deposited on supports such as, for example, active carbon, pumice, silica gel, aluminum oxide or silicate, or bentonite. When the noble metal is used on a support, it is advantageous to have metal contents from 1 to 20 percent by weight, based on the total weight of metal and support; nevertheless, these limits are not essential. The quantity of metal catalyst to be used can vary within fairly wide limits; it can, for example, represent from 0.1 to 5 percent by weight, preferably 0.3 to 1 percent, based on the solvent medium.

The pressures under which the operation takes place are generally higher than five bars and are preferably from 50 to 120 bars. Lower pressures are not excluded, but they would lead to low reaction velocities. There is no critical upper limit for the pressure but the very high pressures are of no interest for technical and economic reasons.

The proportions of compound to be oxidized and of oxygen can vary within wide limits but, for safety reasons, it is necessary to keep outside proportions which give explosive mixtures, so that in practice a large excess of olefine is used in the majority of cases.

The ratio between the number of moles of solvent and the number of moles of compound to be oxidized and contained in the solvent is advantageously at least equal to 1.

The temperature is preferably between 60° and 100° C. It is possible to work at temperatures outside these limits; however, too low temperatures lead to insufficient reaction velocities and higher temperatures cause a partial decomposition of the D.M.S.O.

The process of the invention can be carried out in the following manner. The water-D.M.S.O. mixture and the catalyst are introduced into a vessel which permits of working under pressure, whereafter the compound to be oxidized and oxygen and/or air are introduced up to the selected total pressure, and the vessel is heated. It is also possible to heat the solvent before introducing the gases. When the gas absorption is complete, the vessel is allowed to cool, the gaseous products are discharged and the liquid products are separated, for example, by distillation.

It is also possible to operate continuously, preferably using a reaction apparatus of tubular form in which the water, the D.M.S.O. and the catalyst are kept at constant proportions and into which the water, the D.M.S.O., the olefine and the oxygen are introduced continuously, while the oxidation products and the reactants which have not reacted are withdrawn continuously.

If the olefine is gaseous under the working conditions, the oxidation can be effected as follows. A water-D.M.S.O. mixture, containing the catalyst in suspension, is introduced through the top of a pressure-resistant vertical tube, maintaining a constant level by appropriate withdrawal from the bottom of the column. While maintaining the reaction medium at a high temperature and under pressure, a stream of a gaseous mixture composed of olefine and oxygen is caused to pass upwardly, while simultaneously there is discharge of gaseous products which are condensed. The condensate is then worked up, for example by distillation, and that portion of the oxygen-olefine reactants which has not reacted is recycled into the reaction zone. The initial products which are consumed are continuously made up.

If the olefine is liquid and soluble in the water-D.M.S.O. mixture, it is advantageous to modify the foregoing process by causing the olefine to circulate from top to bottom and no longer from bottom to top. In this case also, the products of the reaction are drawn off through the bottom. It is advantageous to provide the vertical tube with a filling similar to those of distillation columns, in order to ensure a more intimate contact of the different substances participating in the reaction.

cooled by a mixture of acetone and solid carbon dioxide, followed by a hydroxylamine hydrochloride bubbler (which retains the last residues of acetaldehyde) and a potassium carbonate bubbler for retaining carbon dioxide.

The fraction collected in the cooled trap is added to the reaction medium and the whole is distilled. The fraction boiling below 98° C. is collected. A water-acetaldehyde mixture is thus obtained, the acetaldehyde content of which is determined with hydroxylamine hydrochloride. The distillation residue is filtered, the catalyst residue is washed, and the quantity of acetic acid in the filtrate is determined by alkalimetry.

The following table gives, for the various operating conditions, the quantities of acetic acid and acetaldehyde formed, the yields of these two compounds based on the ethylene consumed, and the quantity of $CO_2$ produced based on the ethylene consumed.

TABLE

| Example | Comparison test | 1 | 2 | 3 | 4 | 5 | 6 | 7 | 8 | 9 | 10 | 11 |
|---|---|---|---|---|---|---|---|---|---|---|---|---|
| T° | 80 | 80 | 80 | 80 | 80 | 80 | 80 | 80 | 80 | 100 | 80 | 80 |
| $P_1$ ($C_2H_4$) in bars | 50 | 50 | 50 | 50 | 50 | 50 | 50 | 50 | 50 | 50 | 50 | 25 | 40 |
| $P_2-P_1$ (air) in bars | 50 | 50 | 50 | 50 | 50 | 50 | 50 | 50 | 50 | 50 | 25 | 40 |
| Percent of water in solvent (by volume) | 100 | 0 | 2.5 | 5 | 10 | 50 | 90 | 97.5 | 50 | 50 | 50 | 50 |
| Percent of D.M.S.O. in solvent (by volume) | 0 | 100 | 97.5 | 95 | 90 | 50 | 10 | 2.5 | 50 | 50 | 50 | 50 |
| Period of absorption | 2h45 | 2h45 | 2h45 | 2h45 | 2h45 | 2h45 | 2h45 | 2h45 | 3h45 | 1h | 2h | 2h45 |
| Decrease in pressure (bars) during the absorption | 14 | 12 | 15 | 15 | 16 | 16 | 15 | 14 | 13 | 16 | 8 | 13 |
| $CH_3CHO$ in grams | 0.32 | 5.41 | 8.15 | 8.89 | 9.34 | 4.36 | 2.08 | 1.23 | 4.84 | 3.15 | 2.01 | 3.67 |
| $CH_3COOH$ in grams | 7.00 | 3.18 | 3.95 | 4.27 | 4.66 | 7.86 | 8.15 | 8.10 | 6.55 | 7.26 | 4.57 | 6.09 |
| $CH_3CHO$, percent | 4.9 | 64.6 | 69.4 | 70.6 | 69.7 | 41.5 | 22.8 | 15.0 | 47.2 | 33.5 | ------ | 4.23 |
| $CH_3COOH$, percent | 78.4 | 27.8 | 24.7 | 24.9 | 25.5 | 51.8 | 65.6 | 72.3 | 46.8 | 56.6 | ------ | 51.2 |
| $CH_3CHO$ percent plus $CH_3COOH$ percent | 83.3 | 92.4 | 94.2 | 95.5 | 95.2 | 93.3 | 88.4 | 87.3 | 94.0 | 90.1 | ------ | 93.5 |
| $CO_2$ percent | 16.7 | 7.6 | 5.8 | 4.5 | 4.9 | 6.7 | 11.6 | 12.7 | 6.0 | 9.9 | ------ | 6.5 |

If the olefine is liquid and partially soluble in the water-D.M.S.O. mixture, it is appropriate to modify these working procedures as a function of the degree of solubility, so as always to obtain the most intimate possible mixing of the reactants, as well as easier separation.

The following examples illustrate the invention.

EXAMPLES 1 to 11

The following general method of procedure is adopted:

200 cc. of solvent as specified in the following table and 10.6 g. of catalyst consisting of palladium on carbon black (Pd content, 10 percent) are introduced into a 1 liter autoclave. The apparatus is closed, flushed with nitrogen, and placed in an oven mounted on a shaker device. The temperature is raised to T° C. (the reaction temperature) with agitation in 1 hour 40 minutes. Ethylene is then introduced to a pressure $P_1$ (in bars), followed by air to a total pressure $P_2$ (in bars), and the reaction is allowed to proceed. The progress of the reaction is followed from the total pressure in the autoclave. On completion of the reaction or slightly beforehand, the agitation is stopped, and the autoclave is cooled to ambient temperature (20° C.). The autoclave is degasified through a trap EXAMPLES 12 to 20

300 cc. of solvent as specified in the following table, 26 g. of styrene and 10.6 g. of a catalyst identical with that used in the preceding examples are introduced into an apparatus identical with that of the foregoing examples. A nitrogen pressure of 10 bars is established in the apparatus, which is heated with stirring up to T°0 Nitrogen is further introduced to a pressure of $P_1$ bars, followed by air to a total pressure of $P_2$ bars. The reaction is allowed to proceed at this pressure, and the evolution of the reaction is followed by means of the total pressure in the autoclave.

The agitation is stopped when the reaction is complete (or earlier in some cases), the autoclave is cooled to ambient temperature (20° C.), and degasified through an ethanol bubbler. The ethanolic solution thus obtained is combined with the previously filtered liquid reaction mass and the reaction products are determined by vapor phase chromatography. The main product of the reaction is acetophenone. The main secondary product is benzaldehyde (2.44 g. in Example 20). Sometimes, a small amount of polystyrene is also formed.

The results are set out in the following table.

TABLE

| Example | Comparison test | 12 | 13 | 14 | 15 | 16 | 17 | 18 | 19 | 20 |
|---|---|---|---|---|---|---|---|---|---|---|
| T° | 95 | 95 | 95 | 95 | 95 | 80 | 85 | 95 | 90 | 90 |
| $P_1$ (nitrogen) bars | 50 | 50 | 50 | 50 | 50 | 25 | 25 | 25 | 40 | 50 |
| $P_2-P_1$ (air) bars | 50 | 50 | 50 | 50 | 50 | 25 | 25 | 25 | 40 | 50 |
| Percent of water in volumes | 100 | 0 | 5 | 20 | 30 | 30 | 30 | 30 | 30 | 30 |
| Percent D.M.S.O. in volumes | 0 | 100 | 95 | 80 | 70 | 70 | 70 | 70 | 70 | 70 |
| Period of absorption | 1h45 | 1h45 | 1h45 | 1h45 | 1h45 | 2h45 | 1h45 | 0h45 | 2h45 | 3h00 |
| Acetophenone in grams | 0.5 | 3.3 | 11.5 | 20.3 | 21.5 | 6.1 | 12.4 | 11.6 | 21.6 | 22.6 |
| Conversion rate of styrene in percent | 37.7 | 36.5 | 63.8 | 96.2 | 100 | 25.8 | 59.5 | 52.6 | 91 | 100 |
| Yield in percent based on introduced styrene | 1.8 | 11 | 38.4 | 67.6 | 71.6 | 20.2 | 41.3 | 38.7 | 72 | 75 |
| Yield in percent based on disappeared styrene | 4.8 | 30.0 | 60.0 | 70.4 | 71.6 | 78 | 69.4 | 73.4 | 79.4 | 75 |

EXAMPLE 21

Into a 1 liter autoclave a mixture of: 180 cc. of D.M.S.O., 20 cc. of water, 10.6 g. of palladium on carbon black (containing 10 percent of metal), and 20.5 g. of cyclohexene is introduced. The autoclave is filled with nitrogen to a pressure of 10 bars. The temperature is raised to 80° C. by heating progressively for 1½ hours. The pressure is raised to 50 bars with nitrogen and then to 100 bars with air. Reaction is allowed to take place for 3 hours at 80° C. The decrease in pressure in the apparatus is five bars. The apparatus is then cooled and degasified, the contents are filtered, and the catalyst is washed with D.M.S.O. 2.9 g. of cyclohex-2-en-1-one are found in the filtrate.

EXAMPLE 22

Into a 1 liter autoclave, 180 cc. of D.M.S.O., 20 cc. of water, 10.6 g. of palladium on carbon black (containing 10 percent of metal), and 42.8 g. of propylene are introduced. The apparatus is flushed with nitrogen and brought to 100° C. in 1½ hours with agitation. The pressure is then 28 bars. The pressure is increased to 78 bars with air. After 1 hour 45 minutes, the pressure is stabilized at 70 bars. The apparatus is cooled and degasified through a hydroxylamine hydrochloride bubbler, containing 100 cc. of a 0.5M-solution of the hydrochloride in a water-ethanol mixture in the volumetric ratio 20/80, followed by a second bubbler containing 100 cc. of 5N potassium carbonate.

The contents of the autoclave are distilled, and 80 cc. of an aqueous fraction, containing the carbonyl derivatives formed, are obtained. The proportions of the products obtained are determined as before and the yields (calculated on the propylene used up) are:

| | |
|---|---|
| acrolein: | 18% |
| acetone and propanal: | 43.2% |
| acrylic and acetic acids: | 28.6% |

1.26 percent of the propylene is oxidized

We claim:

1. Process for the oxidation of an organic olefinic compound into an aldehyde, ketone and/or carboxylic acid which comprises contacting the said organic compound with oxygen in the presence of metallic palladium as catalyst in a liquid medium consisting essentially of 2.5 to 100 percent by volume of dimethyl sulphoxide and 97.5 to 0 percent by volume of water.

2. Process according to claim 1 in which the said organic compound is an olefine of formula:

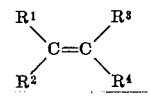

wherein $R^1$, $R^2$, $R^3$, and $R^4$ are the same or different and each represents hydrogen, alkyl of one to 10 carbon atoms, or phenyl, and $R^1$ and $R^3$ may together make up a polymethylene chain of three or four carbon atoms.

3. Process according to claim 2 in which the said olefine is ethylene, propylene, styrene, or cyclohexene.

4. Process according to claim 4 in which the said medium comprises 70 to 99 percent of dimethyl sulphoxide.

5. Process according to claim 1 in which the quantity of the metal catalyst is 0.1 to 5 percent by weight of the said medium.

6. Process according to claim 5 in which the quantity of the metal catalyst is 0.3 to 1 percent by weight of the said medium.

7. Process according to claim 1 in which the pressure is from 50 to 120 bars.

8. Process according to claim 1 in which the reaction temperature is 60° to 100° C.

* * * * *